United States Patent
Shimamoto et al.

(10) Patent No.: US 11,662,060 B2
(45) Date of Patent: May 30, 2023

(54) ACCUMULATOR AND LUBRICANT SUPPLY SYSTEM

(71) Applicant: MITSUBISHI HEAVY INDUSTRIES COMPRESSOR CORPORATION, Tokyo (JP)

(72) Inventors: Kensei Shimamoto, Hiroshima (JP); Takuya Watanabe, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 17/646,193

(22) Filed: Dec. 28, 2021

(65) Prior Publication Data
US 2022/0221103 A1    Jul. 14, 2022

(30) Foreign Application Priority Data

Jan. 8, 2021 (JP) .............................. JP2021-002034

(51) Int. Cl.
*F16N 19/00* (2006.01)
*F16N 7/14* (2006.01)
*F16N 11/04* (2006.01)

(52) U.S. Cl.
CPC ............... *F16N 19/00* (2013.01); *F16N 7/14* (2013.01); *F16N 11/04* (2013.01)

(58) Field of Classification Search
CPC . F16N 7/14; F16N 11/04; F16N 13/06; F16N 19/00; F25B 43/006; F25B 43/043; F15B 1/04
See application file for complete search history.

(56) References Cited

U.S. PATENT DOCUMENTS

| | | | | |
|---|---|---|---|---|
| 337,392 A | * | 3/1886 | Gerlach | F16N 11/04 184/45.1 |
| 4,371,360 A | * | 2/1983 | Ojima | F16H 7/0848 474/140 |
| 4,466,802 A | * | 8/1984 | Ojima | F16H 7/0848 474/140 |

FOREIGN PATENT DOCUMENTS

| | | |
|---|---|---|
| JP | H08-247101 A | 9/1996 |
| JP | 2001-248538 A | 9/2001 |

* cited by examiner

*Primary Examiner* — Minh Truong
(74) *Attorney, Agent, or Firm* — Osha Bergman Watanabe & Burton LLP

(57) ABSTRACT

An accumulator includes a tank body having a communication port that communicates the lubricant accommodating space capable of accommodating lubricant with the outside, the tank body extending around an axis, a piston that moves in the axial direction in the tank body to vary the size of the lubricant accommodating space, a spiral spring mechanism having a spiral spring, and a rotational force transmission member that converts a linear movement of the piston into a rotational force around the axis to transmit the converted rotational force. The rotational force transmission member converts a rotational movement due to a restoring force of the spiral spring into a force in the axial direction to move the piston in the axial direction.

5 Claims, 4 Drawing Sheets

US 11,662,060 B2

ACCUMULATOR AND LUBRICANT SUPPLY SYSTEM

BACKGROUND OF THE INVENTION

Field of the Invention

The present disclosure relates to an accumulator and a lubricant supply system.

Priority is claimed on Japanese Patent Application No. 2021-002034, filed Jan. 8, 2021, the content of which is incorporated herein by reference.

Description of Related Art

Patent Document 1 discloses a configuration in which an accumulator is provided in a hydraulic circuit. In this configuration, the accumulator applies a pressure to oil such as lubricant stored in the accumulator using a balloon-shaped bladder or a coil spring, thereby adjusting the pressure and amount of oil in the hydraulic circuit.

SUMMARY OF THE INVENTION

However, as in an accumulator disclosed in Patent Document 1, in an accumulator using a bladder or a coil spring, the pressure applied to oil decreases with the path of time after operation. Therefore, in order to ensure its required pressure at all times during operation, the capacity of a tank body for storing lubricant becomes excessive with respect to its required size. Moreover, in a structure using the bladder or the coil spring, the pressure given by the bladder or the coil spring fluctuates greatly in a state where the amount of lubricant in the accumulator is large or small. Due to this, for example, in a state where the amount of lubricant in the accumulator is small, it is difficult to maintain the supply amount of lubricant constant. As a result, an accumulator that stably supplies lubricant while suppressing the capacity of the tank body is preferable.

The present disclosure provides an accumulator and a lubricant supply system capable of stably supplying lubricant while suppressing the capacity of the tank body.

An accumulator according to a first aspect of the present disclosure includes a tank body having a lubricant accommodating space that formed to accommodate lubricant, and a communication port that allows the lubricant accommodating space to communicate with an outside of the tank body, the tank body extending around an axis, a piston that is movable in an axial direction in which the axis extends in the tank body to vary a size of the lubricant accommodating space by moving in the axial direction, a spiral spring mechanism having a spiral spring, and a rotational force transmission member that is configured to convert a linear movement of the piston in the axial direction into a rotational force around the axis to transmit the converted rotational force to the spiral spring, and configured to convert a rotational movement of the spiral spring around the axis into a force in the axial direction to transmit the converted force to the piston, in which the spiral spring has an inner end portion that is fixed to the rotational force transmission member and an outer end portion that is fixed to the tank body, and is configured to generate the rotational movement by a restoring force, and the rotational force transmission member converts the rotational movement due to the restoring force of the spiral spring into the force in the axial direction to move the piston in the axial direction.

A lubricant supply system according to a second aspect of the present disclosure includes a lubricant circuit that supplies lubricant to a supply target, and the accumulator connected to the lubricant circuit.

According to the accumulator and the lubricant supply system of the present disclosure, lubricant can be stably supplied while suppressing the capacity of the tank body.

DETAILED DESCRIPTION OF THE INVENTION

In the following, an embodiment for implementing an accumulator and a lubricant supply system according to the present disclosure will be described with reference to the accompanying drawings. However, the present disclosure is not limited to this embodiment.

Configuration of Lubricant Supply System

Figure 1:
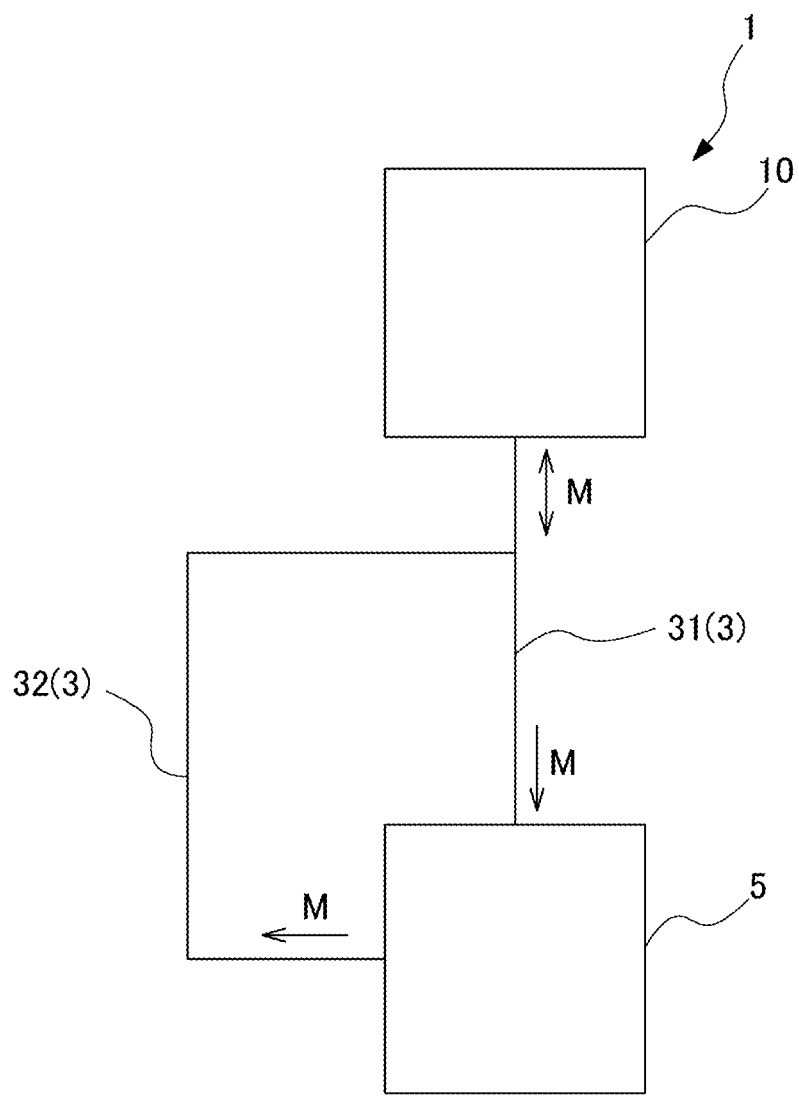
FIG. 1 is a view showing a schematic configuration of a lubricant supply system including an accumulator according to an embodiment of the present disclosure.

As shown in FIG. 1, a lubricant supply system 1 supplies lubricant M to a supply target 5 of the lubricant M. Examples of the supply target 5 include a rotating machine such as a compressor or a turbine. The lubricant supply system 1 mainly includes a lubricant circuit 3 and an accumulator 10.

The lubricant circuit 3 connects the accumulator 10 and the supply target 5. The lubricant circuit 3 supplies the lubricant M fed from the accumulator 10 to the supply target 5, and returns the lubricant used in the supply target 5 to the accumulator 10 via a filter, a cooler, or the like (not shown). The lubricant circuit 3 of the present embodiment has a supply path 31 for feeding the lubricant M to the supply target 5, and a collection path 32 for returning the lubricant M to the accumulator 10. The supply path 31 is connected to the accumulator 10 and the supply target 5. In the present embodiment, the collection path 32 is connected to the supply target 5 and the supply path 31.

Figure 2:
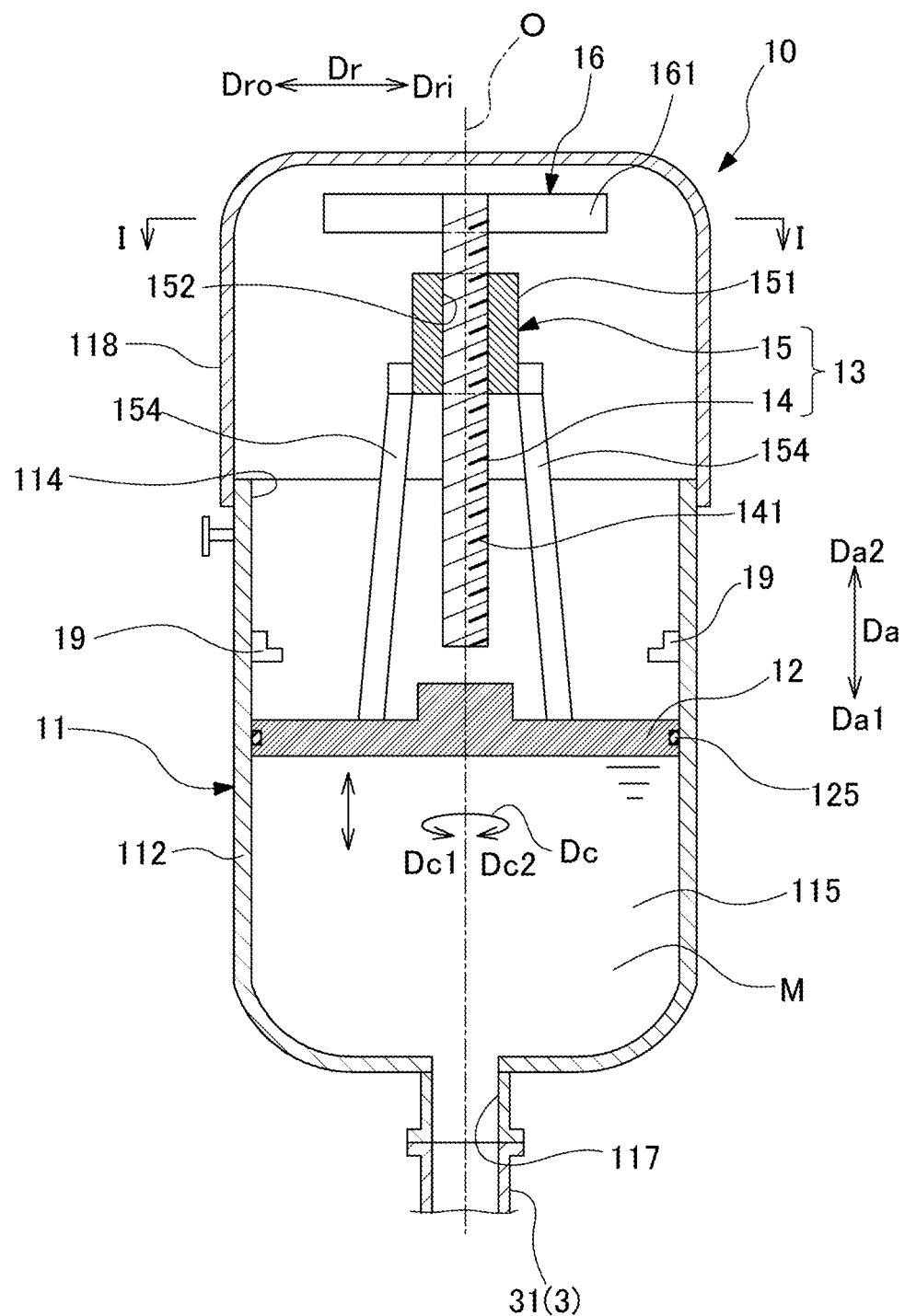
FIG. 2 is a cross-sectional view showing the configuration of the accumulator.

The accumulator 10 is connected to the lubricant circuit 3 to store lubricant supplied to the supply target 5. The accumulator 10 of the present embodiment is capable of supplying the lubricant M at a constant pressure using a restoring force of a spiral spring 161 described later. As shown in FIG. 2, the accumulator 10 of the present embodiment mainly includes a tank body 11, a piston 12, a rotational force transmission member 13, and a spiral spring mechanism 16.

The tank body 11 has an accommodating portion 112 and a cover 118. The accommodating portion 112 extends around an axis O and is formed in a bottomed cylindrical shape with a closed bottom surface. That is, the accommodating portion 112 is closed at a first side Da1 of an axial direction Da through which the axis O extends. An opening portion 114 is formed at a second side Da2 of the axial direction Da of the accommodating portion 112. The axial direction Da in the present embodiment is, for example, a vertical direction. A communication port 117 is formed on a bottom surface of the accommodating portion 112. The communication port 117 is connected to the lubricant circuit 3.

The cover 118 is disposed at the second side Da2 of the axial direction Da of the accommodating portion 112. The cover 118 is mounted on an end portion of the second side Da2 of the axial direction Da of the accommodating portion 112 so as to close the opening portion 114. The cover 118 covers the rotational force transmission member 13 and the spiral spring mechanism 16 described later.

A lubricant accommodating space 115 capable of accommodating the lubricant M is formed in the tank body 11. The lubricant accommodating space 115 is formed in the accommodating portion 112. The lubricant accommodating space 115 is a space interposed between a bottom surface of the accommodating portion 112 and the piston 12 described later. A length of the lubricant accommodating space 115 in the axial direction Da varies depending on a movement of the piston 12. The lubricant accommodating space 115 communicates with the supply path 31 outside the tank body 11 via the communication port 117.

The piston 12 moves in the tank body 11, thereby varying the size of the lubricant accommodating space 115. The piston 12 is movable in the axial direction Da in the accommodating portion 112 of the tank body 11. The piston 12 of the present embodiment is disposed in the accommodating portion 112. The piston 12 is formed in a plate shape formed along a plane orthogonal to the axial direction Da. An outer circumferential surface of the piston 12 is formed with a size in sliding contact with an inner circumferential surface of the accommodating portion 112. A seal member 125 that seals a gap between an outer circumferential surface of the piston 12 and an inner circumferential surface of the accommodating portion 112 is fixed to the outer circumferential surface of the piston 12. The seal member 125 is an annular elastic member such as an O-ring, for example.

The lubricant accommodating space 115 is located at the first side Da1 of the axial direction Da with respect to the piston 12. That is, a volume of the lubricant accommodating space 115 fluctuates so as to increase by moving the piston 12 to the second side Da2 of the axial direction Da. On the contrary, the volume of the lubricant accommodating space 115 fluctuates so as to decrease by moving the piston 12 to the first side Da1 of the axial direction Da.

The rotational force transmission member 13 transmits a movement of the piston 12 to the spiral spring mechanism 16 as a rotational force. Specifically, the rotational force transmission member 13 converts a linear movement of the piston 12 in the axial direction Da into a rotational movement around the axis O to transmit the converted rotational movement to the spiral spring 161 of the spiral spring mechanism 16 described later. Furthermore, the rotational force transmission member 13 converts a rotational movement of the spiral spring 161 around the axis O into a force in the axial direction Da to transmit the converted force to the piston 12. Therefore, the rotational force transmission member 13 is connected to the piston 12 and the spiral spring 161 described later. The rotational force transmission member 13 of the present embodiment has a structure such as a ball screw. Specifically, the rotational force transmission member 13 includes a screw shaft 14 and a housing 15.

The screw shaft 14 rotates around the axis together with the movement of the piston 12 in the axial direction Da. The screw shaft 14 extends along the axis O. The screw shaft 14 of the present embodiment is formed in a columnar shape centered on the axis O. The screw shaft 14 is rotatably supported around the axis O by a shaft bearing (not shown) held on the tank body 11 or the cover 118. A first thread groove 141 is continuously formed in a spiral manner around the axis O on an outer circumferential surface of the screw shaft 14. An end portion of the first side Da1 of the screw shaft 14 in the axial direction Da is relatively movable with respect to the piston 12. An end portion of the second side Da2 of the screw shaft 14 in the axial direction Da is fixed to the spiral spring 161.

The housing 15 is relatively movable in the axial direction Da with respect to the screw shaft 14. The housing 15 is fixed to the piston 12. The housing 15 of the present embodiment has a housing body 151 and a plurality of connecting members 154.

The housing body 151 is formed in a cylindrical shape extending in the axial direction Da. A second thread groove 152 facing the first thread groove 141 together therewith via a ball-shaped top (not shown) is formed on an inner circumferential surface of the housing body 151. The screw shaft 14 is inserted into the housing body 151 in a state where the top rolls between the second thread groove 152 and the first thread groove 141. Accordingly, the housing body 151 is connected in a relatively movable manner to the screw shaft 14 in the axial direction Da.

The plurality of connecting members 154 are connected to the housing body 151 and the piston 12. An end portion of the second side Da2 of the axial direction Da in the connecting member 154 is joined to the housing body 151. The plurality of connecting members 154 extend in an inclined manner from the second side Da2 to the first side Da1 of the axial direction Da so as to spread to an outer side Dro of a radial direction Dr around the axis O. An end portion of the first side Da1 of the axial direction Da in the connecting member 154 is joined to the piston 12. Accordingly, the housing 15 is fixed to the piston 12.

When the screw shaft 14 rotates around the axis O, the housing body 151 moves in the axial direction Da along the screw shaft 14. By the movement of the housing body 151 in the axial direction Da, the piston 12 connected by the connecting member 154 moves in the axial direction Da integrally with the housing body 151. Furthermore, when the piston 12 moves in the axial direction Da, the housing body 151 moves in the axial direction Da integrally with the piston 12. By the movement of the housing body 151 in the axial direction Da, the screw shaft 14 rotates around the axis O.

In this manner, the rotational force transmission member 13 converts a linear movement of the piston 12 in the axial direction Da into a rotational movement around the axis O of the screw shaft 14.

Figure 3:
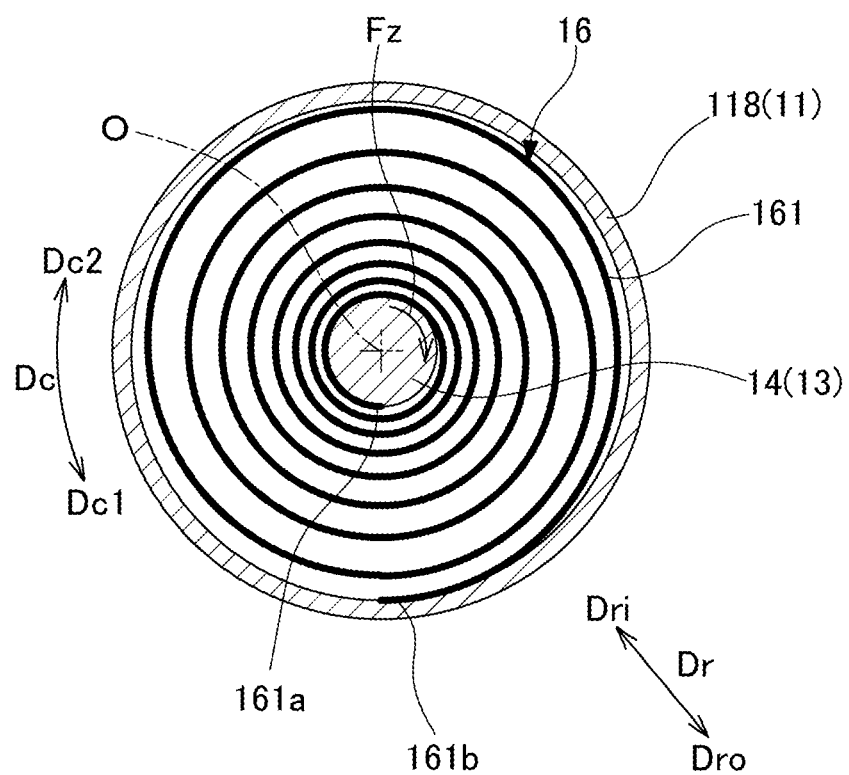
FIG. 3 is a view in which a spiral spring provided in the accumulator is viewed from an axial direction.

The spiral spring mechanism 16 has the spiral spring 161. As shown in FIG. 3, the spiral spring 161 is formed by spirally winding a plate-shaped steel when viewed from the axial direction Da. An outer end portion 161b of the outer side Dro of the radial direction Dr of the spiral spring 161 is fixed to the cover 118. An inner end portion 161a of an inner side Dri of the radial direction Dr of the spiral spring 161 is fixed to the screw shaft 14. The spiral spring 161 exerts a restoring force Fz to be restored so as to generate a rotational movement in a second rotational direction Dc2 of a circumferential direction Dc to the inner end portion 161a in a state of being wound and tightened (wound up) in a first rotational direction Dc1 of the circumferential direction Dc around the axis O.

The spiral spring 161 is wound up by the rotation of the screw shaft 14 in a case where the piston 12 moves to increase the lubricant accommodating space 115. Furthermore, the spiral spring 161 is loosened by the rotation of the screw shaft 14 in a case where the piston 12 moves to decrease the lubricant accommodating space 115.

Due to the restoring force Fz of the spiral spring 161, a rotational movement in the second rotational direction Dc2 of the circumferential direction Dc is generated at the inner end portion 161a of the spiral spring 161. Accordingly, a rotational force in the second rotational direction Dc2 of the circumferential direction Dc is given to the screw shaft 14. When the screw shaft 14 of the rotational force transmission member 13 rotates in the second rotational direction Dc2 of the circumferential direction Dc, the piston 12 moves to the first side Da1 of the axial direction Da along the screw shaft 14 together with the housing body 151. The wound-up spiral spring 161 loosens as the screw shaft 14 rotates in the second rotational direction Dc2 of the circumferential direction Dc.

Due to the restoring force Fz of the spiral spring 161 the piston 12 is pressed against the first side Da1 of the axial direction Da. As a result, the pressure is applied to the lubricant M in the lubricant accommodating space 115 by the piston 12.

Furthermore, the restoring force Fz of the spiral spring 161 varies according to a rotational force around the axis O transmitted from the rotational force transmission member 13. Specifically, in a case where the amount of the lubricant M in the lubricant accommodating space 115 decreases, the volume of the lubricant accommodating space 115 decreases. As a result, the piston 12 moves to the first side Da1 of the axial direction Da together with the rotation of the screw shaft 14. When the screw shaft 14 rotates in the second rotational direction Dc2 of the circumferential direction Dc with the movement of the piston 12 to the first side Da1 of the axial direction Da, the spiral spring 161 is loosened in the second rotational direction Dc2 of the circumferential direction Dc. Accordingly, the restoring force Fz of the spiral spring 161 decreases, and a pressure applied to the lubricant M in the lubricant accommodating space 115 by the piston 12 decreases. As a result, the flow rate of the lubricant M supplied from the lubricant accommodating space 115 to the supply path 31 decreases.

Furthermore, in a case where the amount of the lubricant M in the lubricant accommodating space 115 increases, the volume of the lubricant accommodating space 115 increases. As a result, the piston 12 moves to the second side Da2 of the axial direction Da in the tank body 11 together with the rotation of the screw shaft 14. When the screw shaft 14 rotates in the first rotational direction Dc1 of the circumferential direction Dc with the movement of the piston 12 to the second side Da2 of the axial direction Da, the spiral spring 161 is wound and tightened in the first rotational direction Dc1 of the circumferential direction Dc. Accordingly, the restoring force Fz of the spiral spring 161 increases, and a pressure applied to the lubricant M in the lubricant accommodating space 115 by the piston 12 increases. As a result, the flow rate of the lubricant M supplied from the lubricant accommodating space 115 to the supply path 31 increases.

Figure 4:
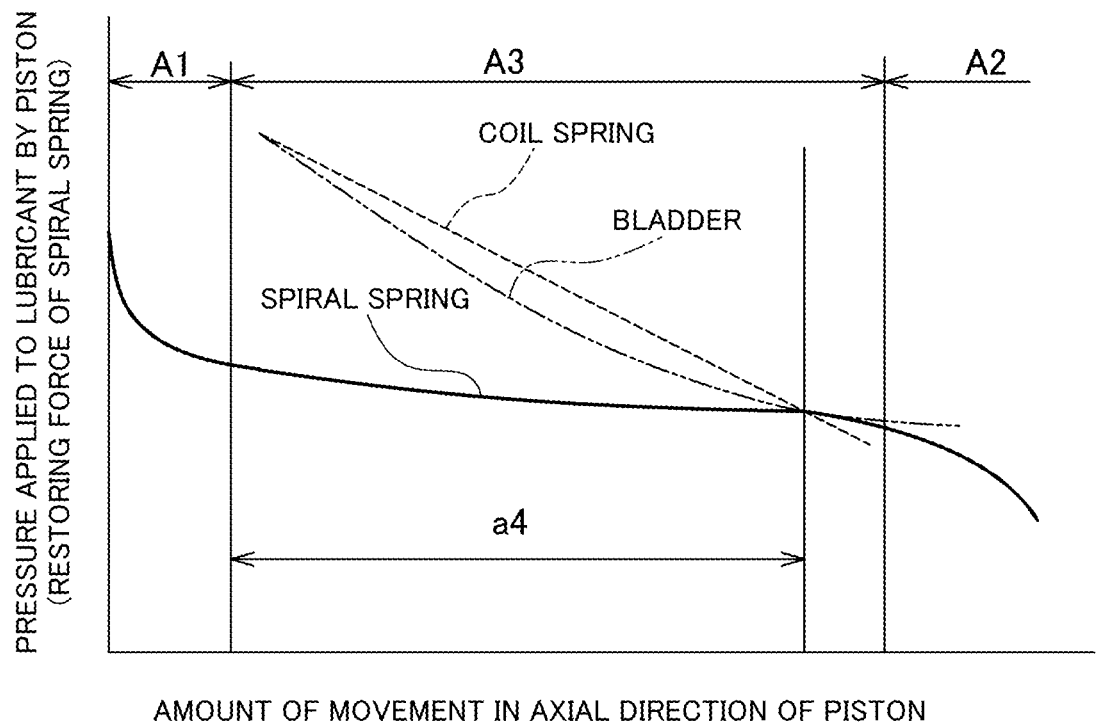
FIG. 4 is a view showing a displacement between the amount of movement of a piston in an axial direction and the pressure applied to lubricant by a restoring force generated by a spiral spring in the accumulator.

Incidentally, the variation of the restoring force Fz is large in a case where a winding-up amount of the spiral spring 161 in the first rotational direction Dc1 of the circumferential direction Dc is large or small, but the variation of the restoring force Fz is small within a predetermined range, thereby maintaining the restoring force Fz to the extent that it can be regarded as a constant value. Specifically, as shown in FIG. 4, the spiral spring 161 has a large variation of the restoring force Fz between a first region A1 closest to the most tightest state and a second region A2 closest to the most loosest state. That is, in the first region A1, the piston 12 is located at the second side Da2 of the axial direction Da, and the winding-up amount of the spiral spring 161 in the first rotational direction Dc1 of the circumferential direction Dc is close to the maximum. Furthermore, in the second region A2, the piston 12 is located at the first side Da1 of the axial direction Da, and the spiral spring 161 is in the most open state. In the first region A1 or the second region A2, even when the amount of movement in the axial direction Da of the piston 12 (the amount of winding of the spiral spring 161) is small, the restoring force Fz being varied is large, and as the variation of the restoring force Fz is large, the variation of the pressure applied to the lubricant M in the lubricant accommodating space 115 by the piston 12 is also large.

On the other hand, the spiral spring 161 has an intermediate region A3 between the first region A1 and the second region A2, which can be regarded as having almost no change in the restoring force Fz. In the intermediate region A3, even when the amount of movement in the axial direction Da of the piston 12 (the amount of winding of the spiral spring 161) is large, the restoring force Fz being varied is small, and as the variation of the restoring force Fz is small, the variation of the pressure applied to the lubricant M in the lubricant accommodating space 115 by the piston 12 is also small.

Moreover, in a case where a bladder or a coil spring is used instead of the spiral spring 161, the variation of the restoring force varies in a substantially linear manner according to the amount of movement in the axial direction Da of the piston 12. That is, the variation of the pressure applied to the lubricant M by the piston 12 varies significantly in a substantially linear manner according to the amount of movement in the axial direction Da of the piston 12.

In the present embodiment, the spiral spring 161 is set such that a fluctuation range of the restoring force Fz falls within a predetermined range a4 in the intermediate region A3 in a case where the spiral spring 161 is wound as the piston 12 moves in the axial direction Da. Due to this, as shown in FIG. 2, a stopper 19 is provided in the tank body 11. The stopper 19 regulates the movement of the piston 12 to the second side Da2 of the axial direction Da. The stopper 19 is fixed to an inner circumferential surface of the accommodating portion 112. The stopper 19 protrudes from the accommodating portion 112 toward the inner side Dri of the radial direction Dr. The stopper 19 regulates the amount of movement of the piston 12 such that the restoring force Fz due to the spiral spring 161 is within the predetermined range a4 described above.

Advantageous Effects

The accumulator 10 having the above configuration gives a rotational force that rotates around the axis O with respect to the screw shaft 14 by the restoring force Fz of the spiral spring 161. The rotational force is converted into a force in the axial direction Da by the screw shaft 14 and the housing 15, thereby giving a force trying to move in the axial direction Da to the piston 12. As the piston 12 tries to move in the axial direction Da, the pressure applied to the lubricant M in the lubricant accommodating space 115 fluctuates. The pressure on the lubricant M can be adjusted by using the restoring force Fz of the spiral spring 161 in this manner. Furthermore, as compared with a bladder or a coil spring, the change of the restoring force Fz exerted by the spiral spring 161 is small. Due to this, in a state where the amount of the lubricant M accommodated in the lubricant accommodating space 115 is large and small, a fluctuation amount of pressure given from the piston 12 to the lubricant M in the lubricant accommodating space 115 by the restoring force Fz of the spiral spring 161 is small. Therefore, a pressure close to a constant value can be always given to the lubricant M, and the pressure given to the lubricant M is suppressed from dropping during operation and when time has passed from the operation. Due to this, like the case where a bladder or a coil spring is used, it is not required to increase the capacity of the tank body 11 in order to secure the pressure applied to the lubricant M. Accordingly, the capacity of the tank body 11 can be suppressed to stably supply the lubricant M at a substantially constant pressure.

Furthermore, the spiral spring 161 is wound in a case where the lubricant M flows into the lubricant accommodating space 115 from the outside through the communication port 117, and the piston 12 moves so as to increase the lubricant accommodating space 115. That is, the spiral spring 161 is wound by the rotation of the screw shaft 14 as the piston 12 moves to the second side Da2 of the axial direction Da. As such, the restoring force Fz of the spiral spring 161 is increased. Therefore, in a case where the lubricant M in the lubricant accommodating space 115 increases, the pressure applied to the lubricant M can be increased. Furthermore, the accumulator 10 can be easily operated without the need to rotate the screw shaft 14 by an external force other than the pressure of the lubricant M in order to wind the spiral spring 161.

Furthermore, when the screw shaft 14 rotates around the axis O, the housing 15 with the screw shaft 14 inserted thereinside moves in the axial direction Da of the screw shaft 14. The piston 12 fixed to the housing 15 moves in the axial direction Da integrally with the housing 15 by moving the housing 15 in the axial direction Da. With such a configuration, a rotational force of the screw shaft 14 around the axis O can be effectively converted into a moving force of the piston 12 in the axial direction Da.

Furthermore, the stopper 19 that regulates the amount of movement of the piston 12 is provided inside the tank body 11. A rotation range of the screw shaft 14 that rotates around the axis O is regulated together with the movement of the piston 12 in the axial direction Da as a movement range in the axial direction Da of the piston 12 in the tank body 11 is regulated by the stopper 19. As a result, the range of rotational force transmitted by the rotational force transmission member 13 is regulated. Accordingly, the amount of winding of the spiral spring 161 can be regulated to operate the accumulator 10 within the predetermined range a4 where the variation of the restoring force Fz due to the spiral spring 161 is small.

The lubricant supply system 1 as described above includes the accumulator 10 connected to the lubricant circuit 3. Accordingly, a stable pressure can be applied to the lubricant M by providing the accumulator 10 that uses the restoring force Fz of the spiral spring 161.

OTHER EMBODIMENTS

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

Furthermore, in the above embodiment, the configuration of each part of the accumulator 10 has been described, but the configuration of each part may be appropriately modified as long as the required function can be implemented. For example, the spiral spring mechanism 16 is not limited to the configuration of the present embodiment. The spiral spring mechanism 16 may further have a mechanism for winding the spiral spring in advance in order to escape from the second region A2 of the spiral spring 161.

Supplement

The accumulator 10 and the lubricant supply system 1 according to an embodiment are understood as follows, for example.

(1) The accumulator 10 according to a first aspect includes a tank body 11 having a lubricant accommodating space 115 formed to be capable of accommodating lubricant M, and a communication port 117 that allows the lubricant accommodating space 115 to communicate with an outside of the tank body 11, the tank body extending around an axis O, a piston 12 that is movable in an axial direction Da in which the axis O extends in the tank body 11 to vary the size of the lubricant accommodating space 115 by moving in the axial direction Da, a spiral spring mechanism 16 having a spiral spring 161, and a rotational force transmission member 13 that is configured to convert a linear movement of the piston 12 in the axial direction Da into a rotational force around the axis O to transmit the converted rotational force to the spiral spring 161, and configured to convert a rotational movement of the spiral spring 161 around the axis O into a force in the axial direction Da to transmit the converted force to the piston 12, in which the spiral spring 161 has an inner end portion 161a that is fixed to the rotational force transmission member 13, and an outer end portion 161b that is fixed to the tank body 11, and is configured to generate the rotational movement by a restoring force Fz, and the rotational force transmission member 13 converts the rotational movement due to the restoring force Fz of the spiral spring 161 into the force in the axial direction Da to move the piston 12 in the axial direction Da.

The accumulator 10 gives a rotational force that rotates around the axis O with respect to the rotational force transmission member 13 by the restoring force Fz of the spiral spring 161. The rotational force transmission member 13 converts the rotational force into a force in the axial direction Da, thereby giving a force trying to move in the axial direction Da to the piston 12. As the piston 12 tries to move in the axial direction Da, the pressure applied to the lubricant M in the lubricant accommodating space 115 fluctuates. The pressure on the lubricant M can be adjusted by using the restoring force Fz of the spiral spring 161 in this manner. Furthermore, as compared with a bladder or a coil spring, a change of the restoring force Fz exerted by the spiral spring 161 is small. Due to this, in a state where the amount of the lubricant M accommodated in the lubricant accommodating space 115 is large and small, a fluctuation amount of pressure given from the piston 12 to the lubricant M in the lubricant accommodating space 115 by the restoring force Fz of the spiral spring 161 is small with respect to a fluctuation amount in the amount of lubricant M. Therefore, a pressure close to a constant value can be always given to the lubricant M, and the pressure given to the lubricant M is suppressed from dropping during operation and when time has passed from the operation. Due to this, unlike the case where a bladder or a coil spring is used, it is not required to increase the capacity of the tank body 11 in order to secure extra pressure applied to the lubricant M. Accordingly, the capacity of the tank body 11 can be suppressed to stably supply the lubricant M at a substantially constant pressure.

(2) The accumulator 10 according to a second aspect is the accumulator 10 of (1), in which the spiral spring 161 is configured to wind by the rotational force transmitted from the rotational force transmission member 13 in a case where the piston 12 moves to increase the lubricant accommodating space 115.

Accordingly, the spiral spring 161 is wound by generating the movement of the piston 12 to increase the lubricant accommodating space 115. As such, the restoring force Fz of the spiral spring 161 is increased. Therefore, in a case where the lubricant M in the lubricant accommodating space 115 increases, the pressure applied to the lubricant M can be increased.

(3) The accumulator 10 according to a third aspect is the accumulator 10 of (1) or (2), in which the rotational force transmission member 13 includes a screw shaft 14 that extends in the axial direction Da and is fixed to the inner end portion 161a, and a housing 15 that is movable in the axial direction Da with respect to the screw shaft 14 in a state where the screw shaft 14 is inserted, and is fixed to the piston 12.

Accordingly, when the screw shaft 14 of the rotational force transmission member 13 rotates around the axis O, the housing 15 moves in the axial direction Da of the screw shaft 14, and the piston 12 moves in the axial direction Da integrally with the housing 15. With such a configuration, a rotational force of the screw shaft 14 around the axis O can be effectively converted into a moving force of the piston 12 in the axial direction Da.

(4) The accumulator 10 according to a fourth aspect is the accumulator 10 of any one of (1) to (3), and further includes a stopper 19 fixed to an inside of the tank body 11 and is configured to regulate the movement of the piston 12 in the axial direction Da, in which the stopper 19 regulates the amount of movement of the piston 12 such that the restoring force Fz due to the spiral spring 161 falls within a predetermined range a4.

According to such a configuration, a range of rotational force transmitted by the rotational force transmission member 13 is regulated by regulating the range of movement in the axial direction Da of the piston 12 in the tank body 11 by the stopper 19. Accordingly, the amount of winding of the spiral spring 161 can be regulated to operate the accumulator 10 within the predetermined range a4 where the variation of the restoring force Fz due to the spiral spring 161 is small.

(5) The lubricant supply system 1 according to a fifth aspect includes a lubricant circuit 3 that is configured to supply the lubricant M to the supply target 5, and the accumulator 10 of any one of (1) to (4), which is connected to the lubricant circuit 3.

Accordingly, a stable pressure can be given to the lubricant M of the lubricant circuit 3 at an outside thereof by providing the accumulator 10 that uses the restoring force Fz of the spiral spring 161. Therefore, the pressure of the lubricant M can be stably maintained in the lubricant supply system 1.

EXPLANATION OF REFERENCES

1: Lubricant supply system
3: Lubricant circuit
31: Supply path
32: Collection path
5: Supply target
10: Accumulator
11: Tank body
112: Accommodating portion
114: Opening portion
115: Lubricant accommodating space
117: Communication port
118: Cover
12: Piston
125: Seal member
13: Rotational force transmission member
14: Screw shaft
141: First thread groove
15: Housing
151: Housing body
152: Second thread groove
154: Connecting member
16: Spiral spring mechanism
161: Spiral spring
161a: Inner end portion
161b: Outer end portion
19: Stopper
A1: First region
A2: Second region
A3: Intermediate region
a4: Range
Da: Axial direction
Da1: First side
Da2: Second side
Dc: Circumferential direction
Dc1: First rotational direction
Dc2: Second rotational direction
Dr: Radial direction
Dri: Inner side
Dro: Outer side
Fz: Restoring force
M: Lubricant
O: Axis

What is claimed is:

1. An accumulator comprising:
a tank body having a lubricant accommodating space that formed to accommodate lubricant, and a communication port that allows the lubricant accommodating space to communicate with an outside of the tank body, the tank body extending around an axis;
a piston that is movable in an axial direction in which the axis extends in the tank body to vary a size of the lubricant accommodating space by moving in the axial direction;
a spiral spring mechanism having a spiral spring; and
a rotational force transmission member that is configured to convert a linear movement of the piston in the axial direction into a rotational force around the axis to transmit the converted rotational force to the spiral spring, and configured to convert a rotational movement of the spiral spring around the axis into a force in the axial direction to transmit the converted force to the piston, wherein
the spiral spring has an inner end portion that is fixed to the rotational force transmission member and an outer end portion that is fixed to the tank body, and is configured to generate the rotational movement by a restoring force, and
the rotational force transmission member converts the rotational movement due to the restoring force of the spiral spring into the force in the axial direction to move the piston in the axial direction.

2. The accumulator according to claim 1, wherein the spiral spring is configured to wind by the rotational force transmitted from the rotational force transmission member in a case where the piston moves to increase the lubricant accommodating space.

3. The accumulator according to claim 1, wherein the rotational force transmission member includes:
a screw shaft that extends in the axial direction and is fixed to the inner end portion; and
a housing that is movable in the axial direction with respect to the screw shaft in a state where the screw shaft is inserted therein, and is fixed to the piston.

4. The accumulator according to claim 1, further comprising:
a stopper fixed to an inside of the tank body and is configured to regulate the movement of the piston in the axial direction, wherein
the stopper regulates an amount of movement of the piston such that the restoring force due to the spiral spring falls within a predetermined range.

5. A lubricant supply system comprising:
a lubricant circuit that is configured to supply lubricant to a supply target, and
an accumulator according to claim 1, which is connected to the lubricant circuit.

* * * * *